H. F. DANIELS.
REGULATING VALVE.
APPLICATION FILED NOV. 19, 1914.

1,170,050.

Patented Feb. 1, 1916.

WITNESSES:
Charles L. Reynolds.
E. Peterson,

INVENTOR
Herbert F. Daniels
BY
Pierre Barnes
ATTORNEY

UNITED STATES PATENT OFFICE.

HERBERT F. DANIELS, OF SEATTLE, WASHINGTON.

REGULATING-VALVE.

1,170,050.   Specification of Letters Patent.   Patented Feb. 1, 1916.

Application filed November 19, 1914. Serial No. 873,013.

*To all whom it may concern:*

Be it known that I, HERBERT F. DANIELS, a citizen of the United States, residing at Seattle, in the county of King and State of Washington, have invented certain new and useful Improvements in Regulating-Valves, of which the following is a specification.

This invention relates to pressure-controlled valves and is designed, more particularly, for regulating the flow of air into the mixing chamber or manifold of an automobile engine.

The object of the invention is the perfecting of devices of this character.

The invention is illustrated in the accompanying drawings, in which—

Figure 1:
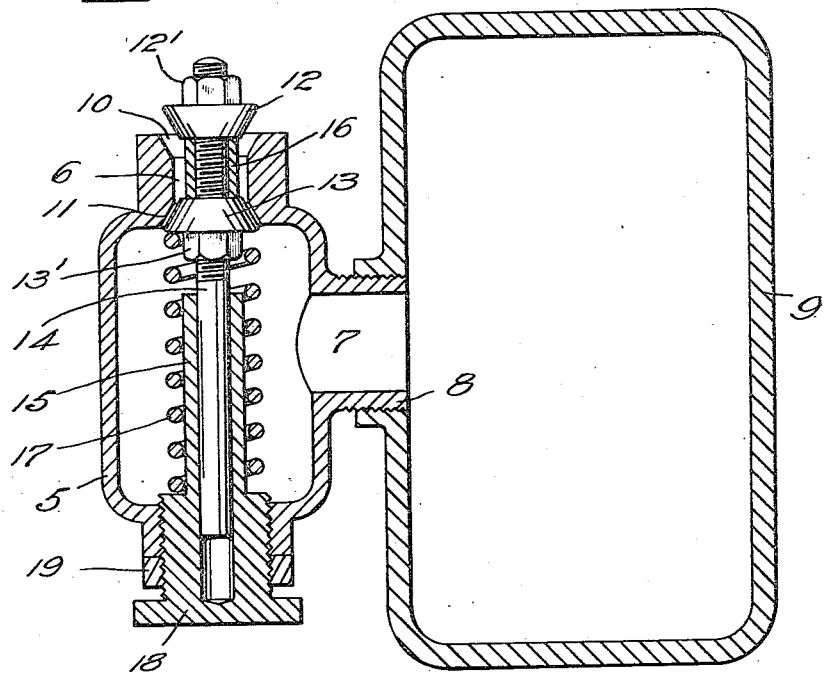
Figure 2:
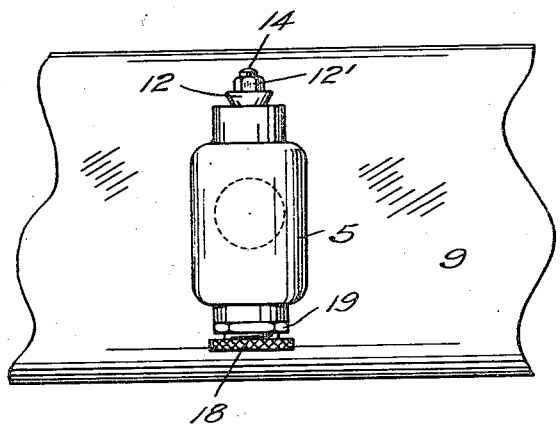

Figure 1 is a longitudinal vertical section of the regulator applied to a gas chamber. Fig. 2 is a front elevational view of the same.

The reference numeral 5 designates the regulator shell or casing, having an induction port 6 at the top and an outlet 7 at a distance therebelow. As shown, this outlet is provided within a nipple 8 screwed into a gas container 9 or the manifold, so-called, of an automobile engine and through which a mixture of combustible gas and air is conducted to the various engine cylinders. At the upper and lower ends of the induction port 6 are provided seats 10 and 11 for valves 12 and 13, respectively. These valves are adjustably connected in opposed relations to a stem 14 which operates in a guide 15. Said valves are desirably secured to the stem by forming a screw-thread upon the latter to engage in screw-threaded holes provided in the valves, and employing locknuts $12^1$ and $13^1$ for the respective valves. 16 is a tubular member inclosing the stem 14 between the two valves to maintain the same at a predetermined distance apart.

17 designates a helical spring interposed between the lower valve 13 and an adjustable plug 18 which is screwed into the lower end of the casing 5. The plug 18 and the guide 15 are most conveniently made integral by forming the latter of less diameter than the plug proper thereby providing an annular shoulder to receive the end of the spring. 19 is a lock-nut engaging the threads of said plug for securing the same in position to afford a desired regulation of the spring.

The valve 13, which may be termed the main valve, is closed upon its seat $13^1$ by the joint action of the spring 17 and the pressure of gas obtaining within the casing 5. The other, or supplementary, valve 12 is closed upon its seat $12^1$ when the pressure within the casing, together with the power of the spring, is less than the external or atmospheric pressure.

The operation of the invention can now be understood. Normally the spring 17 plus the pressure of the gas within the manifold, will retain the valve 13 against its seat $13^1$. Upon starting the engine, a partial vacuum is created within the manifold of sufficient negative force to render the external atmosphere capable of closing the port by the valve 12. The engine continuing to run and upon opening the throttle, the vacuum within the manifold is quickly reduced by the admission of explosive charges into the manifold. When this occurs, the consequent increased gas pressure is transmitted to the interior of the casing and, coöperating with the spring, causes the valve 12 to be lifted and the main valve 13 pushed against its seat.

From the foregoing it will be seen that in operation, the action of the valve is such that when the engine is started a high vacuum will be immediately created in the manifold causing a seating of valve 12 and cutting off the supply of auxiliary air. As the engine speeds up, the vacuum within the manifold will be decreased and the spring 17 will move the valve 12 away from its seat and move the valve 13 toward its seat so that as a result there will be a decrease of the volume of air admitted through the passage 6. If the vacuum within the manifold decreases sufficiently, the valve 13 will seat entirely and cut off the supply of auxiliary air.

By means of my air regulating devices, it is found that the efficiency of the engine is improved with a more economical consumption of the combustible gases than prevails on an automobile which is unprovided with such devices.

What I claim, is—

The combination with a casing having an inlet port and an outlet opening, said casing being provided with a screw-threaded opening opposite the inlet port, valve seats at opposite ends of the inlet port, a screw-threaded plug fitted in the screw-threaded opening and provided on its outer end with a head adapted to be gripped by an operator, said plug having a reduced stem extending into the casing, the stem and body of the plug being provided with a bore terminating in spaced relation to the outer surface of the head, a stem slidably-mounted within said bore and having a threaded end projecting through the inlet opening, a sleeve mounted on said threaded end, valves on said threaded end bearing against the ends of the sleeve and adapted to close the inner and outer valve seats respectively, nuts on said threaded end holding said valves in position against the sleeve, and a spring surrounding the stem closely and resting against the shoulder formed between the reduced stem and the plug at one end and against one of said valves at the other end.

Signed at Seattle, Wash., this 3rd day of November, 1914.

HERBERT F. DANIELS.

Witnesses:
E. PETERSON,
C. L. REYNOLDS.